United States Patent [19]
Matsuura

[11] 4,282,439
[45] Aug. 4, 1981

[54] X-RAY PHOTOGRAPHING MACHINE USING SHEET FILMS

[75] Inventor: Tetsuo Matsuura, Otawara, Japan

[73] Assignee: Tokyo Shibaura Denki Kabushiki Kaisha, Japan

[21] Appl. No.: 68,684

[22] Filed: Aug. 22, 1979

[30] Foreign Application Priority Data

Aug. 25, 1978 [JP] Japan .................................. 53-103690
Aug. 31, 1978 [JP] Japan .................................. 53-106446
Aug. 31, 1978 [JP] Japan .................................. 53-106448

[51] Int. Cl.³ .................................................. G03B 41/16
[52] U.S. Cl. ........................................ 250/470; 250/468
[58] Field of Search ........................ 250/468, 470, 471

[56] References Cited
U.S. PATENT DOCUMENTS
3,916,206  10/1975  Koch .................................. 250/4 68

Primary Examiner—Craig E. Church
Attorney, Agent, or Firm—Finnegan, Henderson, Farabow, Garrett & Dunner

[57] ABSTRACT

Disclosed is an X-ray photographing machine in which an unexposed sheet film magazine and an exposed sheet film magazine mounted on a movable frame are located in offset positions relative to an axis extending along a rectilinear path of a carrier to transfer a sheet film to an exposure station, the longitudinal axes of the magazines extending in parallel with each other and substantially at right angles to the axis along the carrier path.

A sheet feed mechanism is disposed in a space defined by the respective axes of both these magazines and of the carrier path.

20 Claims, 12 Drawing Figures

X-RAY PHOTOGRAPHING MACHINE USING SHEET FILMS

BACKGROUND OF THE INVENTION

This invention relates to an X-ray photographing machine in which a number of unexposed sheet films are taken out one by one from a supply magazine containing such films, and carried into a film carrier in a stand-by position by means of a feed mechanism, the carrier is moved from the stand-by position to an exposure position, where it is exposed to X-rays for X-ray photographing and returned to the stand-by position, and then the film is carried into an exposed film takeup magazine by means of the feed mechanism.

Having various advantages, such as faster operation and ease of post-photographing treatment, over those which employ roll films or films each contained in a holder of their own, X-ray photographing machines using such sheet films or cut films have recently come to enjoy wider use.

Nevertheless, conventional machines of this type have hitherto been subject to several shortcomings, requiring positive improvement. As a premise for the description of this invention, therefore, there will now be described in brief a prior art X-ray photographing machine using sheet films and problems involved therein.

FIG. 1 shows an outline of the prior art X-ray photographing machine using sheet films. In this drawing, there are shown a movable frame a of the machine, a support frame b to support the frame a, a table top c bearing an examinee d, an X-ray source e, and an image intensifier f disposed on the opposite side of the examinee d to the X-ray source e and mounted on the movable frame a.

The movable frame a is capable of general rotation round the examinee d in a body with the support frame b as indicated by an arrow g, slide movement in the longitudinal direction of the examinee d (or at right angles to the plane of the drawing), and vertical motion as indicated by an arrow h independent of the support frame b, whereby the movable frame a approaches and goes away from the examinee d.

A rectilinear path j for a film carrier i defined inside the movable frame a, and the carrier i is normally located in a stand-by position 1 at a considerable distance from an exposure position k. A film supply magazine m and a film takeup magazine n are disposed on the opposite side of the stand-by position 1 to the exposure position k. Unexposed sheet films p in the supply magazine m are drawn out one by one by means of a vacuum sucker q, and delivered into the carrier i by means of paired rolls r. Exposed films are collected from the carrier i returned to the stand-by position into the takeup magazine n through a guide path s by means of the paired rolls r. A transfer plate t is switched with every forward or reverse feed.

In the prior art machine of FIG. 1, the movable frame a is relatively long, since the magazines m and n are disposed substantially on the extension of the carrier path j, that is, they are in line with the stand-by position 1 and the exposure position k, and that the space between the stand-by position 1 and the exposure position k is made considerably wide enough to prevent the unexposed film in the carrier i from what is called X-ray fog in the stand-by position.

Such elongated movable frame a would present the following problems.

(1) Since the movable frame a forms a cantilever structure on the support frame b, the longer the frame a, the greater the demand for the strengthening of the connection between the movable frame a and the support frame b, as well as of the frame a itself, and for the complicated structure and increased overall machine size. In particular, mounted near the free end of the frame a weighing considerably heavy, the image intensifier f has a great influence on the frame structure.

(2) Since the space between the stand-by position 1 and the exposure position k is wide, the transfer distance of the carrier i is long, thus increasing loss of time for the transfer. As a result, many opportunities of photographing may probably be missed.

As for the magazines m and n, they involve the following problems. That is, as mentioned before, the movable frame a is located in positions at varied angles for the photographing of the examinee d from different angles. In some shots, for example, the frame a may be turned through an angle of 180° from the position of FIG. 1, that is, inverted. In such position, openings u and v of the magazines m and n are to face downward. Accordingly, the sheet films p may possibly slip out of the magazines through their openings or bend to cause a handling mistake, so that correct and secure handling of films could not be expected.

SUMMARY OF THE INVENTION

Accordingly, the primary object of this invention is to provide a high-performance X-ray photographing machine which obviates the aforementioned defects of the prior art machines, capable of substantial reduction of a movable frame in length, lightening of the load on a support section without requiring positive strengthening of the frame structure, and reduction of the overall size of the machine and transfer distance of a carrier, as well as of smooth film treatment without bent or slipped out of openings of film supply and takeup magazines during operation.

Another object of this invention is to provide an X-ray photographing machine capable of fast and exact conveyance of sheet films in connection with the above primary object.

In order to attain the above objects, there was made the following epochal proposal. That is, according to this invention, two magazines are not arranged in line with exposure and stand-by positions of a carrier, but are located in offset positions relative to such positions, and the longitudinal axes of the magazines are disposed substantially at right angles to an axis extending along a carrier path.

Thus, the length of a movable frame is reduced considerably. Moreover, the stand-by position is brought as close to the exposure position as possible, and, in order to prevent X-ray fog, the movable frame is provided with an X-ray screening member such as lead disposed between the carrier in the stand-by position and an X-ray source. The screening member is allowed to be arranged in spite of its substantial weight because its effect on the frame is diminished due to the reduction of the length of the movable frame. Moreover, the carrier is formed of two plates, and another X-ray screening member is mounted on a hinge portion of these plates which is located on the exposure position side, thereby additionally preventing the effect of X-ray fog.

By these measures, the length of the movable frame may be reduced to about half that of the conventional one or less.

In order to prevent the slipping of the sheet films accompanying the turning of the movable frame, the machine of the invention includes a backup urging means formed of a backup plate and a spring disposed inside the film supply magazine, whereby the films are urged across the thickness thereof. With respect to the film takeup magazine, the movable frame is fitted with a plate member which, along with paired film takeup rolls, components of a films feed mechanism, partially enters a film intake opening of the magazine when the magazine is located in its operative position on the frame.

Thus, the films contained in both magazines may be arranged in an orderly way without regard to the position of the movable frame, eliminating the problems of the prior art construction.

In connection with the aforementioned positioning of the magazines, the film feed mechanism is compactly arranged within a space defined by the longitudinal axes of the magazines and the axis extending along the carrier path.

DETAILED DESCRIPTION OF THE PREFERRED EMBODIMENTS

Now there will be discribed some embodiments of this invention with reference to the accompanying drawings.

Figure 2:
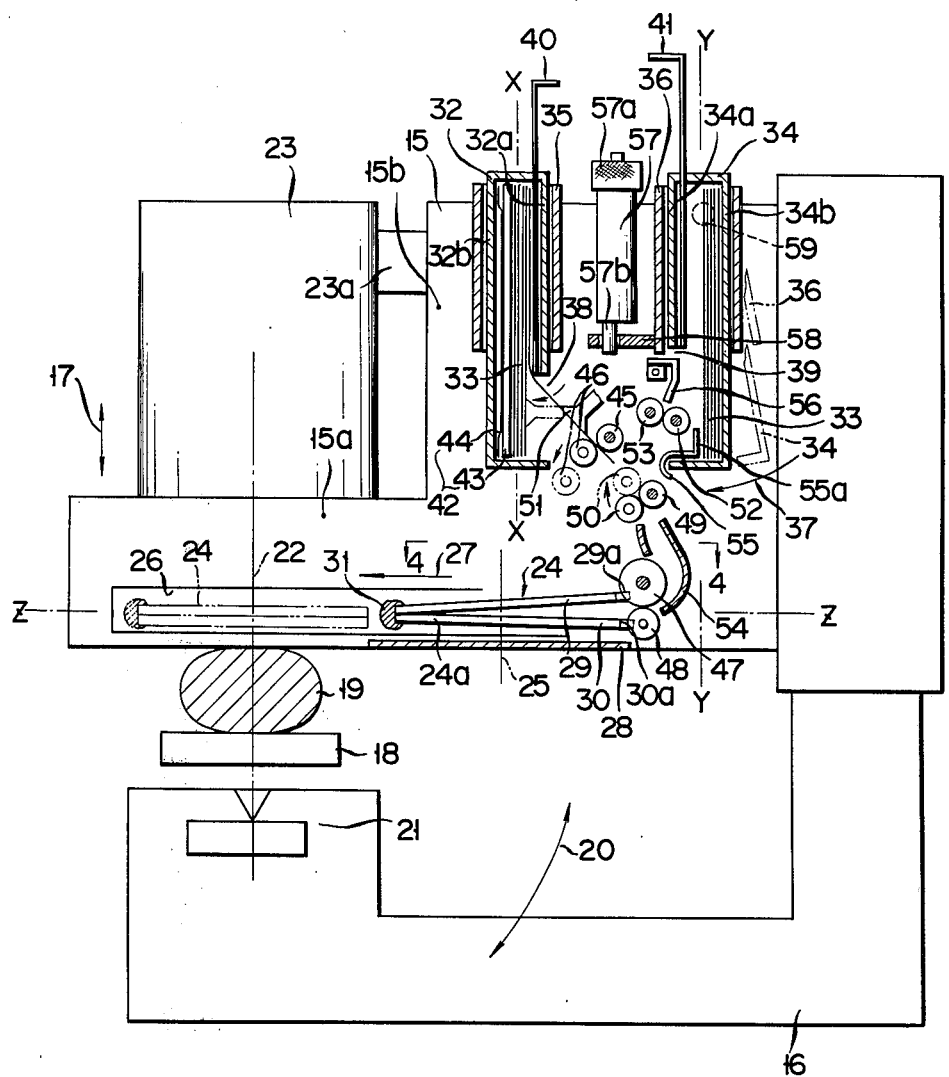
FIG. 2 is a partially broken elevational view of an X-ray photographing machine according to this invention.

Referring now to the drawing of FIG. 2, an L-shaped movable frame 15 can move relatively to a support frame 16 in a vertical direction, as indicated by an arrow 17, so that it may approach and go away from an examinee 19 lying on a table top 18. Also, the frame 15 is capable of turning round the examinee 19 in concert with the support frame 16, as indicated by an arrow 20, and of movement in the longitudinal direction of the examinee 19 or at right angles to the plane of the drawing.

The support frame 16 is held by a forklike frame (not shown) which is rotatably supported by a gantry (not shown).

The state of the X-ray photographing machine shown in FIG. 2 is an upstanding state.

On the support frame 16 is a source 21 to produce X-rays disposed below the examinee 19. An exposure position 22 is located at the free end portion of the movable frame 15 on the opposite side of the examinee 19, while an image intensifier 23 is mounted on the frame 15 above the exposure position 22.

In FIG. 2, a chain line indicates a state in which a film carrier 24 is located in the exposure position 22, while a full line indicates a stand-by position 25 where the carrier 24 is normally located. The space between the stand-by position 25 and the exposure position 22 is quite narrow, as may be seen from the comparison with the prior art construction of FIG. 1. Accordingly, a rectilinear path 26 for the carrier 24 defined inside the frame 15 is short, so that the carrier 24 may move from the stand-by position 25 to the exposure position 22 in the direction of an arrow 27 in a reduced period of time. Here an axis extending along the carrier path 26 is designated by Z—Z. At the base portion of the movable frame 15 is an X-ray screening member 28 such as lead disposed over a range corresponding to the length of the carrier 24 just below the stand-by position 25 of the carrier 24. Interposed between the carrier 24 and the X-ray source 21, the member 28 is covered so as not to cause the carrier 24 to suffer X-ray fog scattered by the X-ray source 21.

The carrier 24, consisting of two rectangular plate members 29 and 30 as illustrated, is formed of X-ray penetrating material. One end edges or edge portion 24a of these plates facing the exposure position side are hinge-coupled, and an X-ray screening member 31 is mounted on the hinge-coupled portion 24a. Such mounting state may also be well seen from FIG. 4. Since X-rays from the X-ray source 21 are applied diagonally to the bottom of the carrier 24 in the stand-by position 25, X-rays that cannot be intercepted by the screening member 28 at the base portion of the frame 15 are covered up by the screening member 31 mounted on the hinge-coupled portion 24a. This is done because the screening member 28 at the base portion cannot be extended further to the left from the location of FIG. 2, for the ease of X-ray photographing.

Off and above the axis Z—Z of the carrier path 26 are a film supply magazine 32 containing unexposed sheet films 33 and a film takeup magazine 34 containing exposed sheet films 33 disposed at a distance in equally offset positions inside the movable frame 15.

The magazines 32 and 34 can be attached to and detached from the movable frame 15, having their corresponding support guide members 35 and 36 mounted on the frame 15.

The magazines 32 and 34 as shown in FIG. 2 are in their normal set positions relative to the frame 15 that enables X-ray photographing operation. The film takeup magazine 34 and the guide member 36 are allowed to rock between an operative position indicated by a full line and a non-operative position indicated by a chain line, as mentioned later. When the film takeup magazine 34 rocks in the direction of the arrow 37 to take the operative position, the respective longitudinal axes X—X and Y—Y of the magazines 32 and 34 become parallel with each other, and substantially perpendicular to the axis Z—Z of the carrier path 26.

Figure 1:
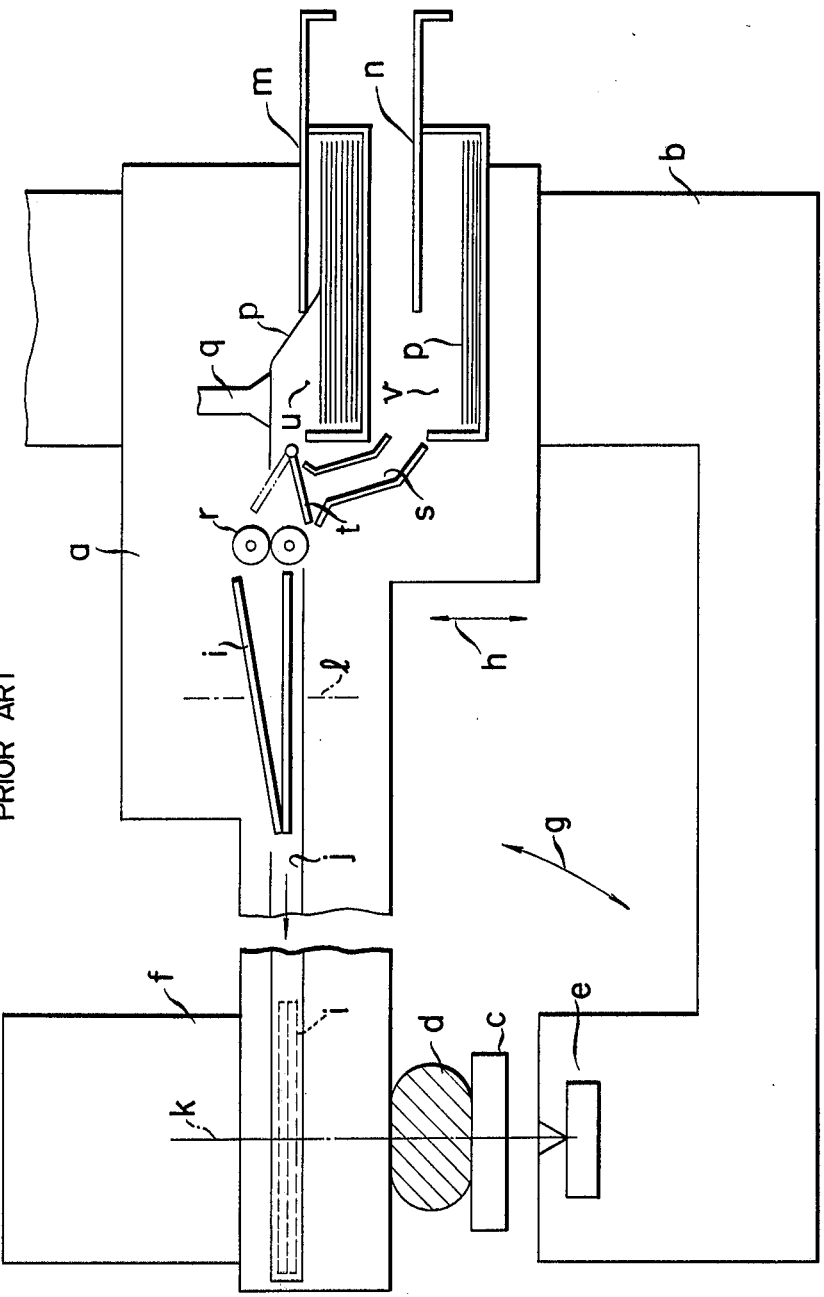
FIG. 1 is a diagrammatic elevational view of a prior art X-ray photographing machine for comparison with this invention.

Accordingly, in the X-ray photographing machine of this invention, the locations of the magazines 32 and 34 are not in line with the stand-by position 25 and the exposure position 22 of the carrier 24, unlike the arrangement of FIG. 1. Both these positions 25 and 22 are located at an elongated first frame section 15a of the L-shaped frame 15, while the magazines 32 and 34 are disposed at a second frame section 15b at right angles to the first frame section 15a. Thus, the length of the frame 15 may greatly be reduced.

The image intensifier 23 is coupled to the second frame section 15b of the frame 15 by means of a bridge member 23a, for further stability in strength.

A film takeout opening 38 of the supply magazine 32 and a film intake opening 39 of the takeup magazine 34 face each other at the same height. Both magazines have substantially the same shape, each presenting an appearance of a rectangular box as shown in the perspective view of FIG. 3 for the supply magazine 32, for example. The magazines 32 and 34 have their respective top plates 32a and 34a and bottom plates 32b and 34b in parallel with one another as well as with the longitudinal axes X—X and Y—Y, the top plates 32a and 34a having the openings 38 and 39 defined therein, respectively.

The respective openings 38 and 39 of the magazines 32 and 34, which are normally open in the set position, are closed with slide covers 40 and 41 when taking the magazines in or out of the frame 15. In each magazine, the sheet films 33 are located in layers along the longitudinal axis X—X or Y—Y of the magazine.

In one magazine or the film supply magazine 32 is a film urging means 42 formed of a backup plate 43 and a leaf spring 44. By this means 42, the unexposed sheet films 33 in the magazine 32 are urged in a direction to cross the longitudinal axis X—X. Thus, even if the supply magazine 32 has its takeout opening 38 turned downward from the position of FIG. 2 accompanying the turning of the movable frame 15, the films contained therein will never slip out or bend.

A film feed mechanism is compactly arranged in a location between the film supply magazine 32 and the film takeup magazine 34 and above the axis Z—Z of the carrier path 26, that is, in a space surrounded and defined by the longitudinal axes X—X and Y—Y of the magazines 32 and 34 and the axis Z—Z of the carrier path 26.

The film feed mechanism includes a plurality of paired rolls (advance rolls 45 and 46, feed-takeout rolls 47 and 48, and transport rolls 49 and 50) for forwardly transferring each unexpected sheet film 33 from the supply magazine 32 to the carrier 24 in the stand-by position 25. The paired advance rolls 45 and 46 are disposed near the takeout opening 38 of the supply magazine 32. Between the rolls 45 and 46 and the takeout opening 38 is a vacuum sucker 51 to draw sheet films out of the takeout opening 38 by using a vacuum effect. In the drawing the vacuum sucker 51 rocks from a position indicated by full line to a position indicated by a chain line in an arrowed direction, and then returns again to the full-line position to draw out a single film. The drawn film is indicated by a full line in FIG. 2.

The advance roll 46 is supported by the movable frame 15 so that it can move from a nipping position indicated by a full line to a position indicated by a chain line, with respect to the other roll 45. The roll 46 moves when the vacuum sucker 51 draws out the film 33. When the drawn film touches the immobile roll 45, the roll 46 returns to the full-line position to hold the film and then carries it in a forward direction. Since the roll 46 is movable, the film may securely be caught by the advance rolls 45 and 46.

The paired feed-takeout rolls 47 and 48 are disposed in close vicinity to the end edge of the carrier 24 in the stand-by position 25. These rolls 47 and 48 are rotated selectively in a forward direction to feed the film 33 into the carrier 24 and in a reverse direction to take the film out of the carrier 24.

Figure 4:
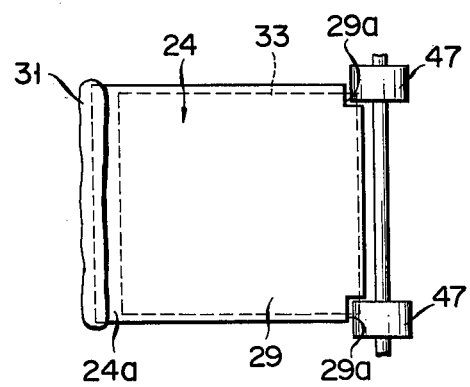
FIG. 4 is a partial view as taken along line 4—4 of FIG. 2, showing a film carrier and film feed-takeout rolls.

Notches 29a and 30a are formed at the respective both-side corners of the end edges of the upper and lower plates 29 and 30 constituting the carrier 24, the rolls 47 and 48 partially entering the notches 29a and 30a, respectively. This situation is clearly shown in FIG. 4. As shown in FIG. 4, the paired rolls 47 and 48 are provided in two sets, which correspond to the side edge portions of the film passing between them. Such double-roll construction goes also for the advance rolls, the transport rolls, takeup rolls 52 and 53 as mentioned later.

The construction of the notches 29a and 30a is intended as follows. That is, when the exposed film has returned along with the carrier 24 to the stand-by position, corner portions of the film exposed through the notches on both sides automatically engage the nipping points of their corresponding rolls 47 and 48, thereby facilitating the film takeout by means of the rolls. Accordingly, there will not be required any special positive film delivery means between the carrier 24 and the rolls 47 and 48.

The paired transport rolls 49 and 50 are disposed between the advance rolls 45 and 46 and the feed-takeout rolls 47 and 48, and film feed guide plates 54 are interposed between the rolls 49 and 50 and the lower rolls 47 and 48. By these guide plates 54, the film may smoothly be guided and transferred without being abruptly bent.

The roll 50 of the transport rolls can selectively rock, relatively to the roll 49, from a full-line position to a chain-line position in an arrowed direction, while maintaining its nipping press against the roll 49. In a forward film feeding operation, the roll 50 is in the full-line position of FIG. 2, and a tangent which touches the rolls at their nipping point is in line with the film feed direction. At this time, both these rolls 49 and 50 are rotated in the forward direction. In a reverse film feeding operation, on the other hand, the roll 50 rocks to the chain-line position, and the rotations of both rolls are reversed. Then, the tangent passing through the nipping point of the rolls shifts its position from the position for the forward feeding.

Namely, the transport rolls 49 and 50 tend to switch the running course of the film between the forward and reverse directions.

The film feed mechanism further includes the paired takeup rolls 52 and 53 disposed correspondingly to the intake opening 39 of the takeup magazine 34 and facing each other. The rolls 52 and 53 constitute, in concert with the transport rolls 49 and 50 and the feed-takeout rolls 47 and 48, a roll means to reverse the film run.

The paired takeup rolls 52 and 53 partially enter the intake opening 39 when the takeup magazine 34 is located in the operative position as indicated by a full line in FIG. 2.

Below the takeup rolls 52 and 53 is a film pressure plate member 55 fixed to the movable frame 15, an upper end portion 55a of the number 55 entering the intake opening 39 of the magazine 34 in the operative position. The upper end portion 55a closes up a portion of the intake opening 39 below the rolls 52 and 53, thereby preventing the films 33 from slipping out through such portion.

Above the takeup rolls 52 and 53, on the other hand, is a baffle plate 56 rockably mounted on the movable frame 15, corresponding in particular to a portion of the intake opening 39 above the rolls 52 and 53. The baffle plate 56 rocks so as positively to drive a film carried through the takeup rolls 52 and 53 into the magazine 34 after the film has passed through the nipping point of the rolls 52 and 53.

Thus, the takeup rolls 52 and 53 and the plate member 55 are partially admitted in the intake opening 39 of the magazine 34, so that the films will never slip out through the intake opening 39 or bend inside the magazine even if the intake opening is turned downward accompanying the turning of the movable frame 15.

The takeup magazine 34 is somewhat inclined as indicated by a chain line in FIG. 2 when it is first mounted on the frame 15. Thereafter, it rocks as indicated by the arrow 37 to the operative position indicated by a full line, where it is stationed. Therefore, the takeup rolls 52 and 53 and the plate member 55 will constitute no obstacle to the mounting operation.

For the aforementioned rocking motion of the takeup magazine 34, the support guide member 36 is coupled to an eccentric control shaft 57. The control shaft 57, which is rotatably mounted on the movable frame 15, has a knob portion 57a to be manually turned by an operator at its top end and an eccentric pin 57b protruding from its bottom end. The pin 57b engages a connecting member 58 fixed to the lower end portion of the guide member 36.

The operator is supposed to turn the knob 57a thereby previously setting the guide member 36 at a chain-line position around a pivot 59 of the guide member 36, and then to attach the takeup magazine 34 to the guide member 36 as it is. Thereafter, when the knob 57a is turned again, the magazine 34 is driven into the operative position by an eccentric action.

The takeup magazine 34, may however, may be slided crosswise instead of being rocked.

Disposed between the two magazines 32 and 34, the eccentric control shaft 57 requires no additional space therefor. Moreover, the gantry and forklike support frame (not shown) are not located in the portion above the movable frame 15 where the knob 57a is operated, leaving a wide space unoccupied, so that the operation of the knob 57a may be quite easy. Such ease of operation goes also for the magazines. The magazines are mounted and removed also through the top portion of the movable frame 15, which is much more expedient than the way of the prior art machine of FIG. 1 in which the magazines are handled sideways.

Figure 5:
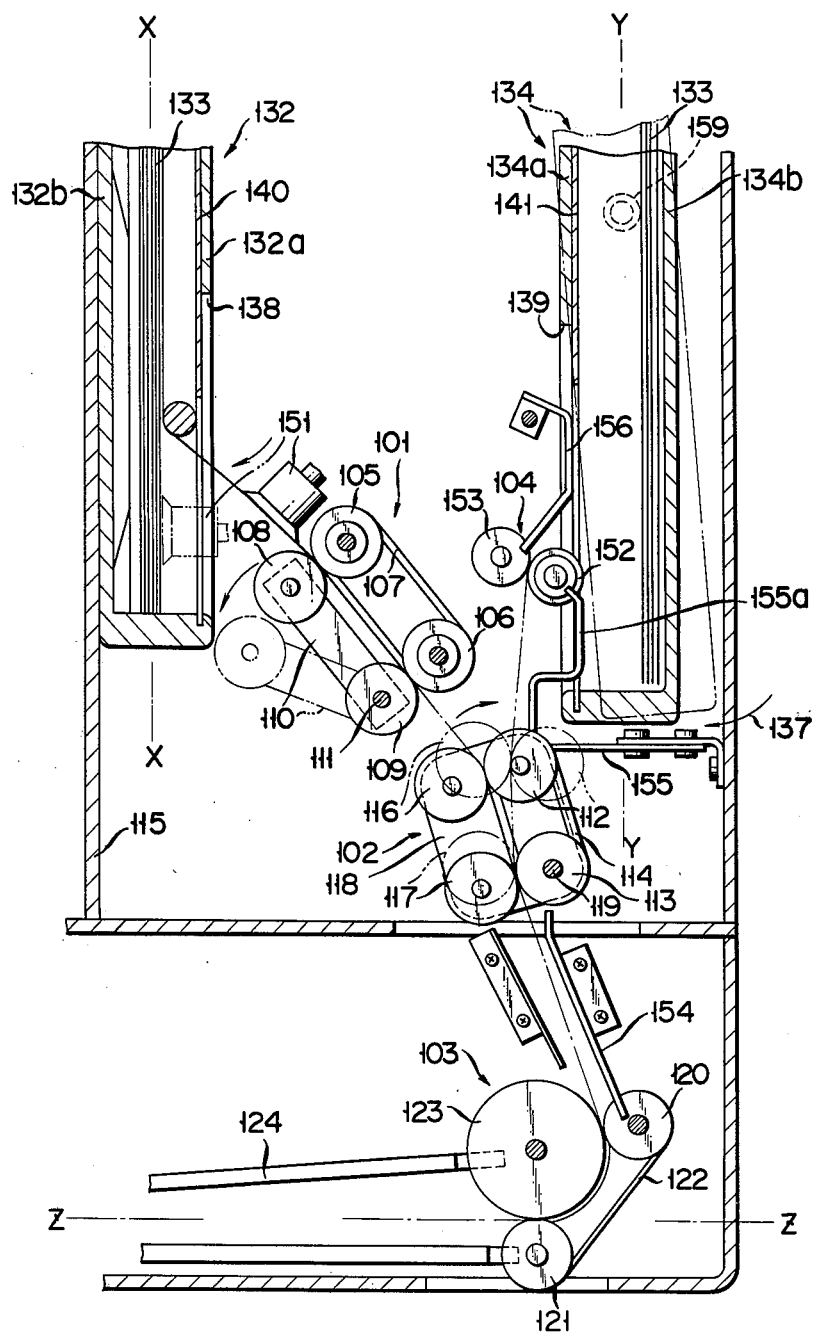
FIG. 5 is an enlarged elevational view of the X-ray photographing machine of FIG. 2, particularly showing a somewhat modified example of a film feed mechanism.

FIG. 5 shows a somewhat modified arrangement of the film feed mechanism of FIG. 2. In this drawing, parts or components corresponding to the ones shown in FIG. 2 are designated by reference numerals whose values exceed the values of their corresponding reference numerals of FIG. 2 by 100 each.

A feed mechanism, which is disposed between a film supply magazine 132 and a film takeup magazine 134 and above an axis Z—Z of a path for a carrier 124, is composed of an advance roll unit 101, transport roll unit 102, feed-takeout roll unit 103, and a takeup roll unit 104.

The advance roll unit 101 and a vacuum sucher 151 are disposed near a takeout opening 138 of the magazine 132. The unit 101 is formed of drive rolls 105 and 106 spaced along the running direction of films 133, an endless drive belt 107 stretched between the drive rolls, and follower rolls 108 and 109 corresponding respectively to the drive rolls 105 and 106, the two follower rolls 108 and 109 being connected with each other by means of a lever 110. The lever 110 may rock round a pivot 111 of one follower roll 109 to a position indicated by chain line in FIG. 5 in an arrowed direction, thereby removing the other follower roll 108 from its corresponding drive roll 105. Thus, the unit 101 is made ready to receive the sheet film 133.

The transport roll unit 102, like the aforementioned advance roll unit 101, is formed of drive rolls 112 and 113 spaced along the feed direction, an endless drive belt 114 stretched between the drive rolls, and two follower rolls 116 and 117, these four rolls being rotatably mounted on a single rocking plate 118. The plate 118 can rock round a pivot 119 of the drive roll 113 to a chain-line position in an arrowed direction. By the rocking of the plate 118, the running direction of the film passing through the unit 102 is shifted through a fixed angle so that the film may flow toward the takeup roll unit 104 in the reverse feed.

The feed-takeout roll unit 103 is formed of a pair of drive rolls 120 and 121, an endless drive belt 122 stretched between the drive rolls, and a follower roll 123 with its circumference partially touching the belt 122, the diameter of the follower roll 123 being larger than that of the drive rolls 120 and 121.

Figure 3:
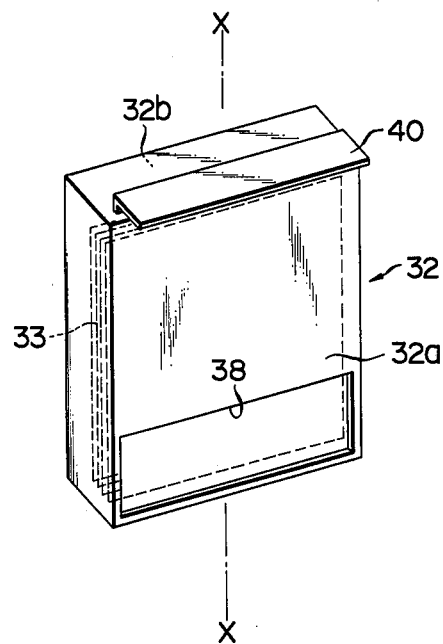
FIG. 3 is a perspective view of a film supply magazine used with the X-ray photographing machine of the invention.

Like the arrangement of FIG. 2, the takeup roll unit 104 is formed of paired rolls 152 and 153 in contact with each other. Whereas only a single unit is shown in FIG. 3, the mechanism actually includes also another set or unit of rolls disposed across the film running direction.

In the feed roll mechanism of FIG. 5, if the forward feed speeds at the advance roll unit 101, transport roll unit 102, and the feed-takeout roll unit 103 are $V_{1f}$, $V_{2f}$ and $V_{3f}$, respectively, in a forward feed process to transfer an unexposed sheet film from the supply magazine 132 to the carrier 124 in a stand-by position, then, according to this invention, the relations between these speeds are as follows:

$V_{1f} < V_{2f} < V_{3f}$. That is, the film advances under some pull at increasing speed as it is carried in a forward direction.

Further, in a return or reverse feed process to transfer an exposed sheet film from the carrier 124 returned to the stand-by position to the takeup magazine 134, if the reverse feed speeds at the takeup roll unit 104, transport roll unit 102, and the feed-takeout roll unit 103 are $V_{4r}$, $V_{2r}$ and $V_{3r}$, respectively, then the relations between these speeds are as follows:

$V_{3r} < V_{2r} < V_{4r}$

That is, the film advances under some pull at increasing speed as it is carried in a reverse direction.

Heretofore, feed rolls in a feed mechanism have usually been all set at the same speed for each feed direction. Such uniform-speed setting has been regarded as absolutely essential to a stable film feed. In this case, however, the speed control of the feed rolls in the feed mechanism need be highly accurate, requiring what is called closed-loop control in which the roll drive speed is detected by means of a tacho-generator or some other speed detector provided for a roll driving system, and feed back to the driving system. Thus, the construction of the roll driving system is complicated, and speed adjustments for the individual rolls, as well as reciprocal adjustments with other rolls, need be made closely.

According to this invention, on the other hand, the aforementioned novel speed relations are applied to the film feed mechanism, so that the roll speed would not require very close adjustment so long as it satisfies the aforesaid relations. Moreover, it is noticed that positive film run with improved stability, as compared with the uniform-speed run, can be achieved without exerting any bad influence on the film itself.

The aforesaid speed relations may apply not only to the construction of FIG. 5 but to the feed roll mechanism of FIG. 2.

Figure 6:
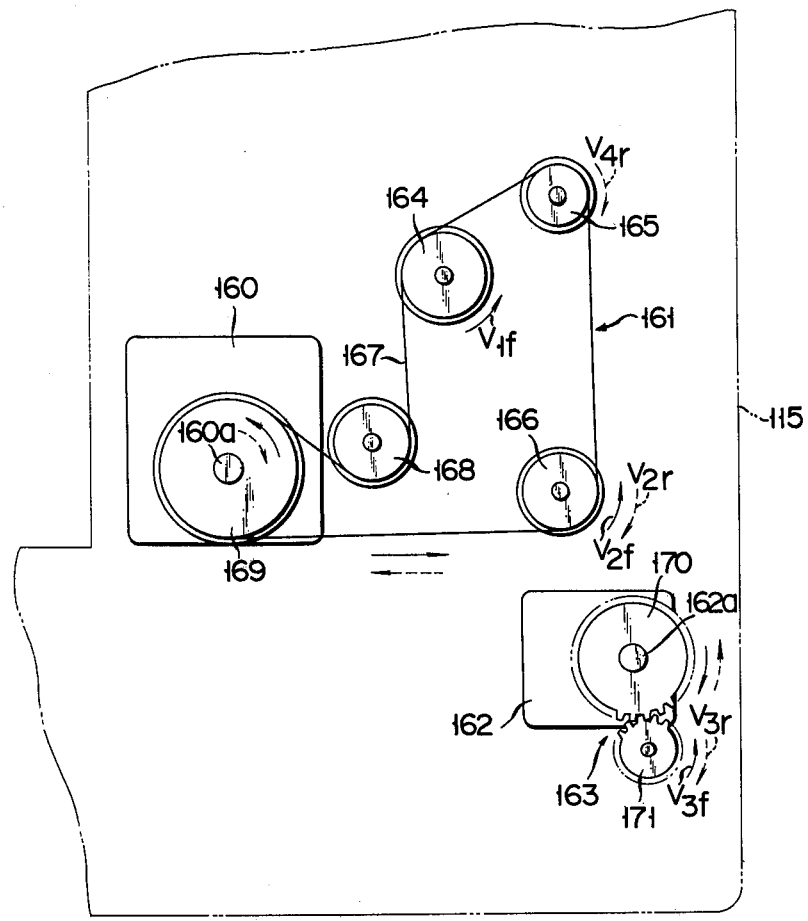
FIG. 6 exclusively shows a driving system for the film feed mechanism of FIG. 5.

FIG. 6 shows a driving system for the feed mechanism of FIG. 5. Here the driving system is divided into two. The first driving system is comprised of a reversible driving motor 160 and an endless-chain transmission, mechanism 161, while the second driving system includes a reversible driving motor 162 and a gear transmission mechanism 163. Both these driving systems are mounted on a movable frame 115 as indicated by a chain line.

In the first driving system, sprocket wheels 164, 165 and 166 are coaxial-coupled with the drive roll 106 of the advance roll unit 101, the drive roll 152 of the takeup roll unit 104, and the drive roll 113 of the transport roll unit 102, respectively. These wheels 164, 165 and 166 are coupled by means of an endless chain 167 through an intermediate wheel 168 to a sprocket wheel 169 fixed on a motor shaft 160a. As for the diameters of these three wheels 164, 165 and 166, the diameter of the wheel 164 is greater than that of the wheel 166, which is larger than that of the wheel 165. Such differences in diameter mean differences in number of teeth; the larger the wheel, the greater the number of teeth on the wheel.

Accordingly, in a drive process in the forward film feed direction as indicated by full-line arrows, the shaft of the larger-diameter wheel 164 rotates more slowly than that of the wheel 166 does. The peripheral speed of the drive roll 106 of the advance roll unit 101, therefore, is lower than that of the drive roll 113 of the transport roll unit 102. Naturally, it is supposed that the diameters of these drive rolls 106 and 113 are equal.

Meanwhile, in a drive process in the reverse film feed direction as indicated by broken-line arrows, the shaft of the larger-diameter wheel 166 rotates more slowly than that of the smaller-diameter wheel 165 does. The peripheral speed of the drive roll 113 of the transport roll unit 102, therefore, is lower than that of the drive roll 152 of the takeup roll unit 104, since the diameters of these drive rolls 113 and 152 are equal.

In the second driving system, a larger-diameter gear 170 fixed on a shaft 162a of the reversible driving motor 162 engages a smaller-diameter gear 171. The smaller-diameter gear 171 is coupled coaxially with the drive roll 120 of the feed-takeout roll unit 103. Therefore, the peripheral rotating speed and direction of the drive roll 120 are determined by means of the driving motor 162 independently of the aforementioned driving system including the driving motor 160 and the transmission mechanism 161. The aforesaid speed relations may be obtained by combining both these driving systems.

Figure 7:
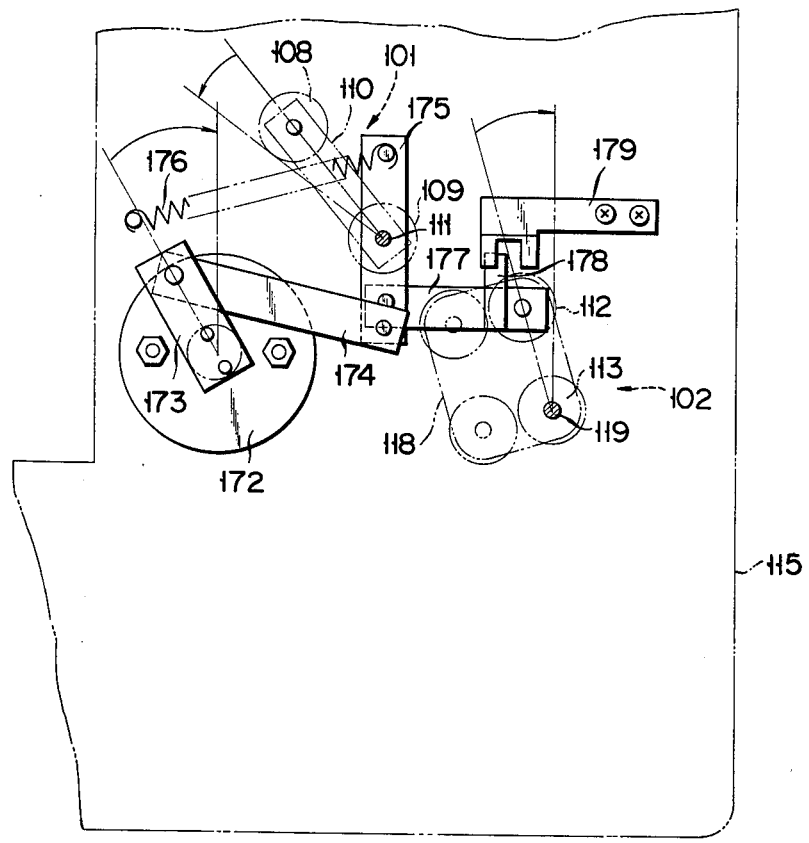
FIG. 7 exclusively shows a driving system for rocking some feed rolls included in the film feed mechanism of FIG. 5.

FIG. 7 shows a roll switching operation system in the film feed mechanism of FIG. 5. This operation system is also mounted on the movable frame 115 as indicated by a chain line.

A lever 173 fixed on the shaft of a rotary solenoid 172 rocks in the arrowed direction from a normal position indicated by a full line through an angular range indicated by a chain line, based on the operation of the solenoid 172.

The lever 173 is connected to a lever 175 by means of a connecting lever 174. The lever 175 is capable of rocking round the pivot 111 of the follower roll 109. Accompanying the rocking of the lever 175, the connecting lever 110 rocks in a body with the lever 175 in the arrowed direction from the illustrated position, which corresponds to the full-line position of FIG. 5, through an angular range indicated by a chain line.

A return spring 176 is hung on one end of the lever 175, while the other end of the lever 175 is connected with one end of a lever 177. The other end of the lever 177 is mounted on the pivot of the drive roll 112. In this drawing, the transport roll unit 102 is in a state corresponding to the full-line position of FIG. 5.

When the rotary solenoid 172 is operated, the spring 176 is stretched by a link motion caused among the levers 173, 174, 175 and 177, thereby rocking the lever 110 to move the follower roll 108 in the arrowed direction. At the same time, the plate 118 of the transport roll unit 102 rocks around the pivot 119 in the arrowed direction through an angular range indicated by a chain line.

Thus, shifting of the follower roll 108 in the advance roll unit 101 and switching of the transport roll unit 102 may be achieved simultaneously by employing the single rotary solenoid 172 for a driving source and also the link motion.

In FIG. 7, a strip 178 fixed to the lever 177 and a bracket 179 relevant thereto constitute a detecting member for the check for the normal link motion.

FIGS. 8 to 12 show a further improved arrangement of the feed-takeout roll unit. In this arrangement, parts corresponding to the ones shown in FIG. 5 are designated by reference numerals whose values exceed the values of their corresponding reference numerals of FIG. 5 by 100 each.

A feed-takeout roll unit 203 is composed of a large-diameter follower roll 223, drive rolls 220 and 221, an intermediate roll 280, and an endless drive belt 222 passed around these rolls. The unit 203 forms a pair with its counterpart, and a sheet film 233 is fed with both edge portions thereof passed through their corresponding units.

Thus, the central portion of the film 233 is freed from the unit 203, for the following reason. That is, if the central or essential portion of the film is passed through the roll unit, its surface will possibly suffer scratches or roll marks, which will be sure to inflict serious mischief on the resolution of the X-ray photographing.

Such central film portion would, however, inevitably be slackened while it is being fed through the unit, often constituting an obstacle to smooth film feed.

According to this invention, therefore, it was suggested that a guide plate 281 be disposed between the units on both sides.

Figure 8:
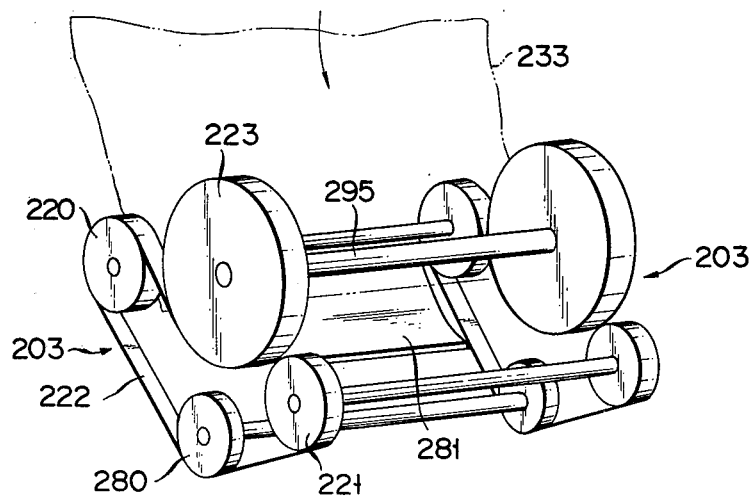
FIG. 8 is a perspective view of a somewhat modified example of a film feed-takeout roll means included in the film feed mechanism of FIG. 5.
Figure 9:
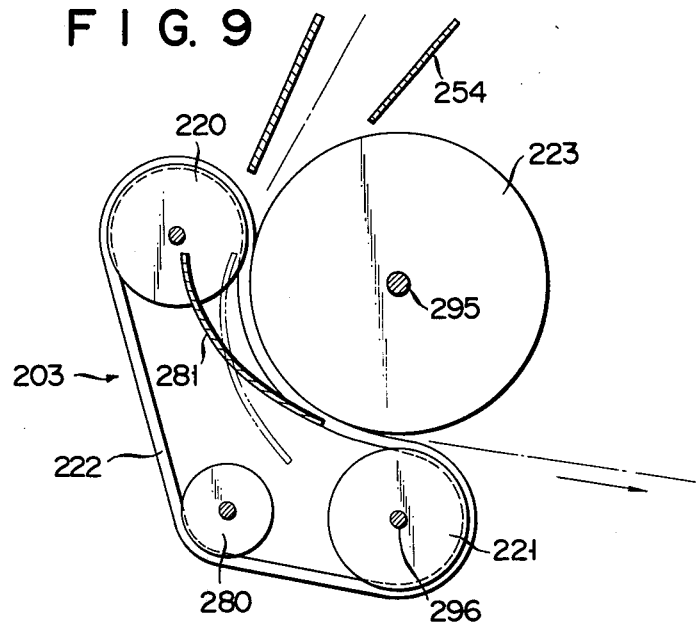
FIG. 9 is a somewhat enlarged side view of the film feed-takeout roll means of FIG. 8 as viewed from the left side thereof.
Figure 10:
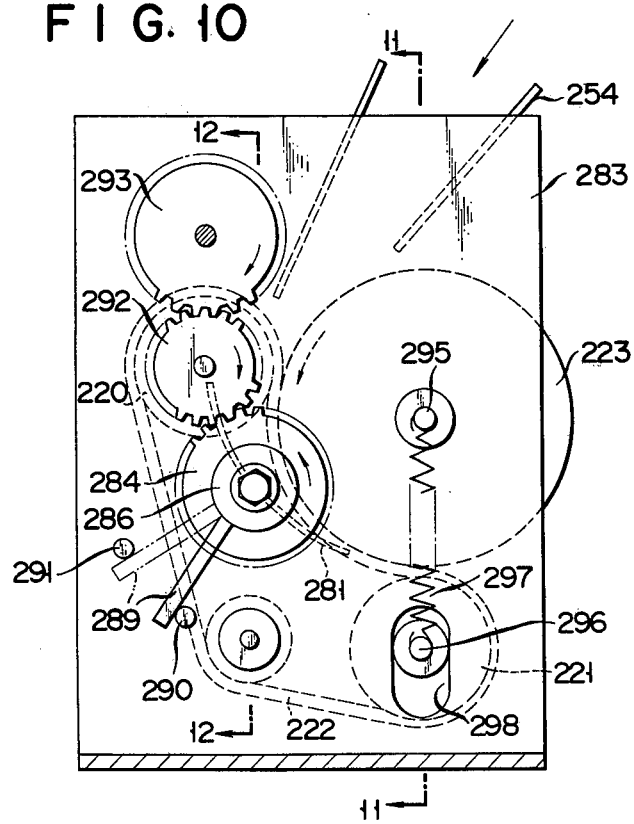
FIG. 10 is an elevational view of a driving system for the film feed-takeout roll means of FIG. 8.

Referring to FIGS. 8, 9 and 10, the sheet film flows in the arrowed direction in the forward feed operation. At this time, the space between the guide plate 281 and the peripheral surface of the follower roll 223 are widened on the film receiving side, as indicated by a full line in FIG. 9. Consequently, the forward end of the film enering the unit 203 may smoothly be inserted between and guided by the guide plate 281 and the follower roll 223 without being caught by the guide plate 281.

In the reverse feed operation to transfer the film oppositely to the arrowed direction, on the other hand, the guide plate 281 is rocked to a position as indicated by a chain line in FIG. 9. As a result, the guide plate 281 is removed from the follower roll 223 on the opposite side to the film receiving side. Thus, the film 233 fed reversely into the unit 203 may be received smoothly between the plate 281 and the follower roll 223.

Figure 11:
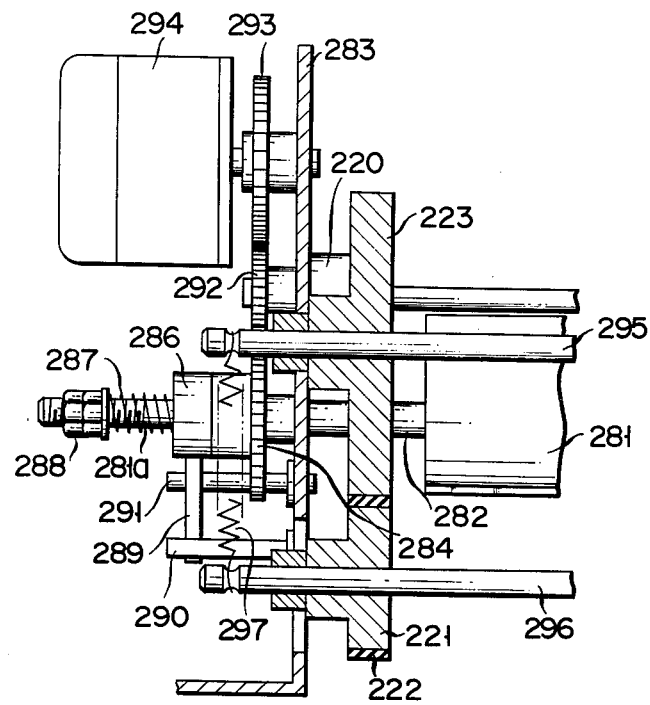
FIG. 11 is a sectional view as taken along line 11—11 of FIG. 10.

FIGS. 10 and 11 show a mechanism for such selective rocking of the guide plate 281. In these drawings, however, there is shown but one of the paired feed-takeout roll units 203.

Figure 12:
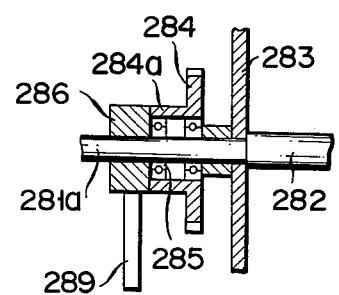
FIG. 12 is a sectional view as taken along line 12—12 of FIG. 10.

A rocking shaft 282 fixed to the guide plate 281 is rotatably mounted on a chassis 283 of a movable frame. A free end of the shaft 282 extends long to the opposite side to the guide plate 281 through the chassis 283. At an extended shaft portion 281a of the shaft 282, a gear 284 is freely sustained by a bearing 285 (FIG. 12). A friction member 286 engages the end face of a boss portion 284a of the gear 284. The member 286 is mounted on the extended shaft portion 281a. The member 286 is urged against the boss portion 284a by a coil spring 287. The using force of the spring 287 is controlled by means of an adjusting nut 288.

Further, a rock lever 289 is fixed to the friction member 286. Within the rocking range of the rock lever 289 are two stop pins 290 and 291 projecting from the chassis 283. By these pins 290 and 291, the rocking of the lever 289 is restricted to an angular range from a full-line portion to a chain-line position as shown in FIG. 10.

The gear 284 engages gears 292 and 293 in order. The gears 292 and 293 rotate coaxially with the drive roll 220 and a reversible driving motor 294, respectively.

Accordingly, when the motor 294 is driven in the forward film feed direction, that is, when the gear 293 is rotated in the direction of a full-line arrow, the drive roll 220, given driving force by the gear 292, drives the unit 203 in the forward feed direction.

At the same time, the gear 284 rotates in the arrowed direction. Then, the friction member 286 rocks to a position as indicated by full line in FIG. 10 where the lever 289 is stopped by the pin 290. Accompanying such rocking, the extended shaft portion 281a also rocks through the same angular range with the lever 289 to turn the guide plate 281 to a broken-line position in FIG. 10 (which corresponds to the full-line position of FIG. 9). After the lever 289 is stopped by the pin 290, the friction surface of the gear 284 slips on the friction member 286 in suspension. In the meantime, the friction member 286 continues to receive urging force in the direction of the rotation from the gear 284. Therefore, the guide member 281 is maintained in the rocked position while the driving motor 294 is in operation.

When the driving motor 294 is reversed to start operation in the reverse film feed direction, on the other hand the lever 289 rocks to a position as indicated by a chain line in FIG. 10, were it is stopped by the other 291. In consequence, the guide member 281 rocks from the broken-line position of FIG. 10 to the chain-line position of FIG. 9, where it is maintained as it is.

Thus, the rocking operation of the guide member 281 is performed by means of driving force provided by the motor 294 to drive the unit 103 and in alignment with the direction of the rotation of the motor. Moreover, in the arrangement of this invention, switching of the motor drive direction and the guide member rock position may automatically be achieved without requiring any timing adjustment.

Furthermore, a spring 297 is stretched between the extended portion of a shaft 295 of the follower roll 223 and the extended portion of a shaft 296 of the drive roll 221. The shaft 296 of the drive roll 221, which is allowed to move within a slot 298 in the chassis 283, is so constructed as to press the drive roll 221 resiliently against the follower roll 223 through the belt 222 by means of the action of the spring 297.

What is claimed is:

1. An x-ray photographing machine comprising:
(a) an X-ray source;
(b) a movable frame adjacent said X-ray source;
(c) an elongated film supply magazine mounted on said movable frame and having top and bottom plates spaced from each other and containing unexposed sheet films, said film supply magazine being closed except for a film takeout opening formed in the top plate thereof;
(d) an elongated film takeup magazine mounted on said movable frame and having top and bottom plates spaced from each other and containing exposed sheet films, said film takeup magazine being closed except for a film intake opening formed in the top plate thereof and facing the film takeout opening of said film supply magazine;
(e) a film carrier on said movable frame and reciprocable along a rectilinear path from a stand-by position adjacent said magazines to an X-ray exposure position adjacent said X-ray source, and
(f) a film feed mechanism operable to transfer an unexposed sheet film from said film supply magazine to said carrier in said stand-by position and to transfer an exposed sheet film from said carrier returned to said stand-by position to said film takeup magazine, said feed mechanism including sucker means located near said takeout opening of the film supply magazine to draw an exposed sheet film out of said film supply magazine through said takeout opening;
(g) said film supply magazine and film takeup magazine being spaced from each other along the rectilinear path of said film carrier, and the longitudinal axis of both said magazines extending substantially at right angles to said rectilinear path;
(h) said film feed mechanism being disposed entirely in a space confined by the longitudinal axes of said magazines and said carrier path and wherein said film feed mechanism further includes:
(a) film advance means disposed in close proximity to said film supply magazine;
(b) film feed-takeout means disposed in close proximity to said carrier in said stand-by position and operable selectively in a forward direction to feed sheet films into said carrier and in a reverse direction to take the sheet films out of said carrier;

(c) film takeup means disposed in close proximity to said film takeup magazine and operable to transfer sheet films from said carrier to said takeup magazine; and (d) film transport means operable selectively in a forward direction to transfer a sheet film from said advance means to said feed-takeout means and in a reverse direction to transfer the sheet film from said feed-takeout means to said takeup means.

2. An X-ray photographing machine using sheet films, comprising;

(a) an X-ray source;

(b) an L-shaped movable frame having an elongated first frame section on which an image intensifier is mounted and a second frame section at right angles to the first frame section;

(c) a film carrier on said movable frame and movable along a rectilinear path, said carrier being operable to carry an unexposed sheet film to an X-ray exposure position adjacent an end portion of the first frame section and said X-ray source and said image intensifier which defines one end of said path, said carrier being operable to carry an exposed sheet film out of said X-ray exposure position to a stand-by position at the other end of said path;

(d) an elongated film supply magazine disposed on said second frame section and having top and bottom plates spaced from each other, said film supply magazine containing unexposed sheet films and being closed except for a film takeout opening defined in the top plate thereof;

(e) an elongated film takeup magazine disposed on said second frame section and having top and bottom plates spaced from each other, said film takeup magazine containing exposed sheet films and being closed except for a film intake opening defined in the top plate thereof and facing the film takeout opening of said film supply magazine; and (f) a film feed mechanism operable to transfer an unexposed sheet film from said film supply magazine to said carrier in said stand-by position and to transfer an exposed sheet film from said carrier returned to said stand-by position to said film takeup magazine, said feed mechanism including sucker means located near said takeout opening of the film supply magazine to draw an unexposed sheet film out of said film supply magazine through said takeout opening;

(g) said film supply magazine and film takeup magazine being spaced from each other along the rectilinear path of said film carrier, and the longitudinal axes of said magazines extending substantially at right angles to said rectilinear path;

(h) said film feed mechanism being disposed entirely in a space confined by the longitudinal axes of said magazines and said carrier path and wherein said film feed mechanism further includes:

(a) film advance means disposed in close proximity to said film supply magazine;

(b) film feed-takeout means disposed in close proximity to said carrier in said stand-by position and operable selectively in a forward direction to feed sheet films into said carrier and in a reverse direction to take the sheet films out of said carrier;

(c) film takeup means disposed in close proximity to said film takeup magazine and operable to transfer sheet films from said carrier to said takeup magazine; and (d) film transport means operable selectively in a forward direction to transfer a sheet film from said advance means to said feed-takeout means and in a reverse direction to transfer the sheet film from said feed-takeout means to said takeup means.

3. An X-ray photographing machine according to claim 1 or 2, further comprising;

(a) film urging means disposed inside said film supply magazine and resiliently urging the sheet films inside said supply magazine across the longitudinal axis thereof, whereby said sheet films are prevented from slipping out through said takeout opening; and (b) means for partially closing said intake opening, thereby preventing the sheet films in said film takeup magazine from slipping out through said intake opening.

4. An X-ray photographing machine according to claims 1 or 2, wherein said film carrier includes a pair of plates having one end hinge-coupled and the other end spaced apart to receive sheet films therebetween, a portion of said plate members including said hinge-coupled ends being covered with X-ray screening material.

5. An X-ray photographing machine according to claims 1 or 2, wherein an X-ray screening member is interposed between said film carrier and said X-ray source when said film carrier is in said stand-by position.

6. An X-ray photographing machine according to claim 1 or 2, wherein said transport means is comprised of a pair of drive rolls spaced along the film feed direction, an endless belt stretched between said drive rolls, two follower rolls disposed respectively in contact with said drive rolls, and a support plate for maintaining said pair of drive rolls and two follower rolls in fixed positional relations, said support plate being capable of rocking round the pivot of one of said paired drive rolls; and said machine further comprising a rotary solenoid and link means selectively rocking said support plate through a fixed angle in response to the operation of said solenoid.

7. An X-ray photographing machine according to claim 1 or 2, wherein said film advance means comprises a pair of rolls facing each other, one of said rolls being able to move from a nipping position in contact with the other roll to a position where said two rolls are spaced apart.

8. An X-ray photographing machine according to claim 1 or 2, wherein said film transport means includes a pair of rolls in contact with each other, said rolls being adjustable so that a tangent passing through a nipping point between said two rolls may be shifted from a position for rotation in the forward direction to a position for the rotation in the reverse direction.

9. An X-ray photographing machine according to claim 1 or 2, wherein the relationship between forward feed speeds $V_{1f}$, $V_{2f}$ and $V_{3f}$ at said advance roll means, said transport roll means, and said feed-takeout roll means which are involved in the forward feed process to transfer the unexposed sheet film from said film supply magazine to said film carrier, are as follows:

$$V_{1f} < V_{2f} < V_{3f}.$$

10. An X-ray photographing machine according to claim 9, wherein the relationship between reverse feed speeds $V_{4r}$, $V_{2r}$ and $V_{3r}$ at said film takeup means, said transport means, and said feed-takeout roll means which are involved in the reverse feed process to transfer the exposed sheet film from said film carrier to said film takeup magazine, are as follows:

$V_{3r} < V_{2r} < V_{4r}$.

11. An X-ray photographing machine according to claim 1 or 2, wherein said feed-takeout means comprises two sets of paired rolls in contact with each other, and said film carrier includes a pair of plate members with one end hinge-coupled and the other ends spaced apart to receive sheet films therebetween, notches being formed respectively in both-side corner portions of the other end edges of said plate members, said sets of paired rolls positioned in said notches.

12. An X-ray photographing machine according to claim 1 or 2, wherein said film feed mechanism further includes first and second roll drive means, said first roll drive means comprising a first reversible motor and an endless drive chain system, whereby said advance means, transport means, and takeup means are driven, and said second roll drive means comprising a second reversible motor and a gear drive system, whereby said feed-takeout means is driven.

13. An X-ray photographing machine according to claim 3, wherein said film urging means is comprised of a backup plate and a spring disposed in said film supply magazine.

14. An X-ray photographing machine according to claim 3, wherein said closing means is fixed on said movable frame and includes a platelike member part of which faces on the film intake opening of said film takeup magazine.

15. An X-ray photographing machine according to claim 1 or 2, wherein said film takeup means includes a pair of rolls in contact with each other and partially located inside the intake opening of said film takeup magazine in a set position.

16. An X-ray photographing machine according to claim 1 or 2, wherein said advance means is comprised of a pair of drive rolls spaced along the film feed direction, an endless belt stretched between said drive rolls, two follower rolls disposed respectively in contact with said drive rolls, and a member connecting said follower rolls at a space apart; said machine further comprising a rotary solenoid and link means rocking said connecting member round the pivot of one of said follower rolls in response to the operation of said solenoid, thereby moving the other follower roll so that said other follower roll may be removed from the drive roll corresponding thereto. claim 1 or 2, wherein said transport means is comprised of a pair of drive rolls spaced along the film feed direction, an endless belt stretched between said drive rolls, two follower rolls disposed respectively in contact with said drive rolls, and a support plate for maintaining said pair of drive rolls and two follower rolls in fixed positional relations, said support plate being capable of rocking round the pivot of one of said paired drive rolls; and said machine further comprising a rotary solenoid and link means selectively rocking said support plate through a fixed angle in response to the operation of said solenoid.

17. An X-ray photographing machine according to claim 1 or 2, wherein said feed-takeout means is comprised of a pair of film feed units spaced across the sheet film, each said unit comprising a pair of drive rolls spaced along the film feed direction, an endless belt stretched between said drive rolls, and a follower roll having an outer peripheral surface on which said belt is wound partially and larger than said drive rolls in diameter; said machine further comprising a rockable film guide plate disposed between said pair of film feed units and also between said pair of drive rolls, means for selectively rocking said guide plate round a pivot extending across the film feed direction, and means for limiting the rocking angle of said guide plate.

18. An X-ray photographing machine according to claim 17, wherein said rocking means includes a reversible motor, a rotary friction member freely mounted on the pivot of said guide plate and rotated by said motor, and another friction member resiliently urged by said friction member and rotatably mounted on the pivot of said guide plate.

19. An X-ray photographing machine according to claim 18, wherein said reversible motor doubles as a means for rotating said pair of drive rolls of said feed-takeout roll means.

20. An X-ray photographing machine according to claim 19, wherein said angle limiting means includes a lever swinging along with the pivot of said guide plate and a pair of stop pins spaced within a swing locus of said lever.

* * * * *